(12) United States Patent
Wehler et al.

(10) Patent No.: US 7,536,849 B2
(45) Date of Patent: May 26, 2009

(54) CHAIN LINK FOR A POWER TRANSMISSION CHAIN AT LEAST PARTLY EMBODIED FROM RECYCLABLE MATERIAL

(75) Inventors: Herbert Wehler, Neunkirchen (DE); Jörg Schulz, Ründeroth (DE)

(73) Assignee: Kabelschlepp GmbH, Siegen (DE)

( * ) Notice: Subject to any disclaimer, the term of this patent is extended or adjusted under 35 U.S.C. 154(b) by 506 days.

(21) Appl. No.: 10/498,179

(22) PCT Filed: Nov. 22, 2002

(86) PCT No.: PCT/EP02/13120

§ 371 (c)(1),
(2), (4) Date: Oct. 8, 2004

(87) PCT Pub. No.: WO03/052291

PCT Pub. Date: Jun. 26, 2003

(65) Prior Publication Data

US 2005/0037881 A1    Feb. 17, 2005

(30) Foreign Application Priority Data

Dec. 17, 2001 (DE) ............................... 101 62 066

(51) Int. Cl.
*F16G 13/16* (2006.01)
(52) U.S. Cl. ........................................................ 59/78.1
(58) Field of Classification Search ................... 59/78.1, 59/900

See application file for complete search history.

(56) References Cited

U.S. PATENT DOCUMENTS

| | | | | |
|---|---|---|---|---|
| 4,198,813 A * | 4/1980 | Hall, Jr. ........................ | 59/80 |
| 5,288,318 A * | 2/1994 | Mayer et al. .............. | 106/126.3 |
| 6,029,437 A * | 2/2000 | Hart ................................ | 59/78 |
| 6,161,372 A | 12/2000 | Wehler | |
| 6,161,373 A | 12/2000 | Heidrich et al. | |
| 6,173,560 B1 * | 1/2001 | Weber ........................ | 59/78.1 |
| 6,708,480 B1 | 3/2004 | Wehler | |
| 6,793,681 B1 * | 9/2004 | Pope et al. ................ | 623/22.15 |

FOREIGN PATENT DOCUMENTS

DE    359223    9/1922

(Continued)

OTHER PUBLICATIONS

Schulte, "Einsatz von nachwachsenden Rohstoffen," Automobil Industrie, Mar. 1992, pp. 220-222.

(Continued)

*Primary Examiner*—Dana Ross
*Assistant Examiner*—Debra M Sullivan
(74) *Attorney, Agent, or Firm*—Smith Law Office (57) ABSTRACT

The invention relates to a chain link for a power transmission chain, at least partly embodied from a composition containing at least: a. a recyclable raw material, b. a material for binding said recyclable raw material and c. optional adjuncts and additives. In comparison to conventional chain links, the above chain link can be produced in a more environmentally-friendly and economical manner with a saving of non-recyclable raw materials, such as for example crude oil whilst retaining similar or adequate functional properties in comparison with conventional chain links for power transmission chains.

2 Claims, 5 Drawing Sheets

FOREIGN PATENT DOCUMENTS

| | | |
|---|---|---|
| DE | 38 06 400 A1 | 7/1989 |
| DE | 38 06 400 C2 | 5/1990 |
| DE | 197 10 489 A1 | 9/1998 |
| DE | 199 34 871 A1 | 6/2001 |
| DE | 199 62 829 A1 | 8/2001 |
| EP | 0 822 353 A2 | 4/1998 |
| EP | 0822353 A2 * | 4/1998 |

OTHER PUBLICATIONS (English Translation) Schulte, "Use of Renewable Raw Materials," Automobile Industry, Mar. 1992, pp. 220-222.

English language Abstract and Translated Description and Claims of DE3806400, European Patent Office's esp@cenet.com database, 3pp.

English language Abstract of DE19710489, European Patent Office's esp@cenet.com database, 1p.

English language Abstract and Translated Description and Claims of DE19934871, European Patent Office's esp@cenet.com database, 6pp.

English language Abstract of DE19962829, European Patent Office's esp@cenet.com database, 1p.

* cited by examiner

CHAIN LINK FOR A POWER TRANSMISSION CHAIN AT LEAST PARTLY EMBODIED FROM RECYCLABLE MATERIAL

CROSS-REFERENCE TO RELATED APPLICATIONS

Not Applicable.

INCORPORATION-BY-REFERENCE OF MATERIAL SUBMITTED ON A COMPACT DISC/REFERENCE TO A "MICROFICHE APPENDIX"

Not Applicable.

BACKGROUND OF THE INVENTION

The invention pertains to a chain link in a power transmission chain, a method for production of such a chain, as well as a power transmission chain.

The prior art knows a number of chain links for power transmission chains having a wide variety of shapes, and produced from a wide variety of materials. For example, chain links made from plastic, metal or a combination of plastic and metal are known. It is also already known to combine different plastics in a chain link. For example, DE 38 06 400 C2 discloses a power transmission chain in which two adjacent chain links are made from different thermoplastics. Wear by friction between two adjacent chain links is supposed to be reduced by this.

In all previously known chain links for power transmission chains, however, there is a disposal problem after the lifetime of the chain link is surpassed. Both the plastics and metals are generally resistant to decay and must be processed, for example, the plastics are cleaned, ground and melted. In addition, all previously used plastics are based on processing of hydrocarbons that are generally produced from petroleum. As is known, petroleum is available to only a limited extent so that sustainable management is necessary with this raw material.

SUMMARY OF THE INVENTION

With this as the point of departure, the task of the invention is to furnish a chain link for a power transmission chain that has functional properties similar to ordinary chain links, but is simple to dispose of and can be produced in an environmentally safe fashion, as well as a method for production of such a chain link. Another task of the invention is to furnish a corresponding power chain.

This task is solved according to the invention by a chain link formed of a composition having a recyclable raw material and a building material. The invention is also directed to a method for production of a chain link or parts of a chain link including the steps of binding a recyclable raw material with a binder to form a chain link composition and forming a chain link from the chain link composition. The invention is also directed to a power transmission chain having at least one chain link formed of a composition of recyclable raw material and a binding material. Additional advantageous embodiments and variants of the chain link and methods for forming chain links are included below.

A chain link according to the invention is made at least partly from a composition containing at least one recyclable raw material, a material that binds this recyclable raw material, as well as optionally auxiliaries and/or additives.

Thus, 50 to 95 weight % of the composition, for example, consists of the recyclable raw material, 5 to 40 weight % of the composition consists of a material that binds this recyclable raw material, and 0 to 10 weight % consists of auxiliaries and additives. However, other compositions with weight percentages deviating significantly from this area are also possible and according to the invention. One such chain link that largely consists of a recyclable raw material has some decided advantages in comparison to ordinary chain links, for example, made of plastic. On the one hand, it is much more cost-effective in production than during the use of a plastic of similar quality, and, on the other hand, has a much better ecological balance than a plastic. In addition, after surpassing the lifetime of the chain link, it is much easier to dispose of it in an environmentally safer fashion. For example, incineration with advantageous use of the heat output of the chain link is possible. Since most of the chain link consists of a biodegradable material, very rapid decay of the chain link can be achieved by an appropriate method, for example, in a composting installation.

Precisely in times of disappearing raw materials, especially among fossil fuels, like petroleum, it is extremely important to manufacture products that have the best possible ecological balance in order to sustainably manage the limited raw material reserves. For this reason it is advantageous in mass-produced products, such as chain links for power transmission chains, to make them with the same and/or sufficiently good material properties from recyclable raw materials.

According to a preferred variant, the chain link consists of a composition of recyclable raw material and a material that binds this with a weight ratio in the range from 3/2 to 19/1, especially 17/3. The weight ratio of 17/3, in particular, has proven advantageous, since most of the composition here consists of the recyclable raw material, i.e., a good ecological balance is present, in which the small fraction of material that binds the recyclable material is large enough so that all the important material properties for operation of a power transmission chain are achieved.

According to another advantageous embodiment, the chain link has at least one, preferably each, of the following of properties:

a) A tensile strength according to DIN 53455 of at least 20 N/mm$^2$, preferably at least 25 N/mm$^2$ and especially in the range of 30 to 200 N/mm$^2$,
b) an elongation at tear according to DIN 53455 of at least 0.5%, preferably at least 0.8%,
c) a tensile modulus of elasticity according to DIN 53455 of at least 4000 N/mm$^2$, preferably at least 5000 N/mm$^2$,
d) a bending strength according to DIN 53432 of at least 40 N/mm$^2$, preferably at least 100 N/mm$^2$ and especially in the range from 100 to 200 N/mm$^2$,
e) an edge fiber elongation according to DIN 53452 of about 2%,
f) a bending modulus of elasticity according to DIN 53452 of at least 3000 N/mm$^2$, preferably of at least 3500 N/mm$^2$,
g) an impact strength according to DIN 53453 of at least 4 kJ/m$^2$, preferably at least 6 kJ/m$^2$,
h) a notched impact strength according to DIN 53453 of at least 2.5 kJ/m$^2$,
i) an indentation hardness according to DIN 53456 of at least 50 N/mm$^2$, preferably at least 150 N/mm$^2$, especially in the range from 180 to 250 N/mm$^2$,
j) a density according to DIN 53479 of at least 1.2 g/cm$^3$, especially at least 1.35 g/cm$^3$, k) an impact tensile strength according to DIN 53448 of about 15 kJ/mm².

Each of the aforementioned properties represents a variant according to the invention. Each possible combination of one or more of the properties marked with the letters a) to k) also represents a preferred embodiment of the invention. When different properties are combined, combinations of two to eleven properties are possible and according to the invention.

In another advantageous embodiment, the chain link is produced from a composition in which the recyclable raw material is a polysaccharide, preferably cellulose. In this context other particularly preferred recyclable raw materials are a material from the group wood, flax, hemp, straw, wool, sisal, cotton, linen, hay, rice husks, bamboo, papyrus, reed, cork, or similar materials or mixtures of at least two of them. All of these are recyclable raw materials that are often also present as waste products in production processes for other products. Thus far, disposal of these waste products has been costly or even environmentally damaging. Each of these fiber-containing or fibrous materials can be used to produce chain links. Thus, it is possible to use wastes from the wood industry or also the clothing industry, from the food industry or other industries expediently and ecologically acceptably. Because of this, the ecological balance of the employed materials is further improved and sustainable management of the raw materials is possible. The available limited resources of hydrocarbons are also spared by this.

According to another advantageous embodiment of the chain link, the binding material is a polymer, preferably an elastomer. Thermoplastic elastomers can be used here and polymers from the group of amide, ester, olefin, styrene or urethane elastomers are worthwhile. It is also possible to use mixtures of several polymers from one or more of these groups.

According to another preferred variant of the chain link, the binding material is a polyhydrocarbon, preferably a polyolefin, preferably polyethylene or polypropylene, especially polypropylene. Polypropylene offers the advantage that it is very easy to process, on the one hand, and readily degradable, on the other.

According to still another advantageous embodiment of the chain link, the composition has at least one auxiliary or additive so that the flash point of the chain link is above 150° C., preferably above 200° C. and especially above 250° C. This permits the use of a chain link according to the invention both under severe stress that accompanies relatively significant heating of the chain link, for example, in spaces with explosion hazard.

According to still another advantageous embodiment of the chain link, the composition contains at least one auxiliary or additive so that the ignition point of the chain link lies above 250° C., preferably above 350° C., and especially about 400° C. This is also advantageous during operation of a power transmission chain with such chain links under particularly stressful use conditions or also in spaces with explosion hazard.

The added auxiliaries or additives can be used not only to change the ignition and/or flash point, but additives and auxiliaries that produce an improvement in frictional wear can be used. Carbon black, for example, would be worthwhile here. In addition, dyes can be added in order to alter the optical appearance of the power transmission chain and adapt it to certain conditions. In addition, antioxidants can be added, which increase the lifetime of the chain links. Another improvement in lifetime can be achieved, for example, by adding stabilizers. Lubricants can also be added, which shorten the cycle times in the production of these chain links, or also produce better and smoother rolling behavior of the chain links when they form a power transmission chain. Fillers that advantageously influence density and bearing capacity of the chain links are also possible. A variety of additional auxiliaries and additives is also possible and according to the invention.

According to another advantageous embodiment of the chain link, it can be coated with at least one material. This coating can be applied according to the invention only to parts or individual partial regions of the chain link. Because of this, the parts that are particularly stressed during rolling of the chain links on each other or on the sliding surfaces of a corresponding guide channel for power transmission chains are improved with reference to their wear behavior. It is also possible to coat the top of the chain links of the lower strand of a power transmission chain with a relatively hard material, while the chain links of the upper strand of a power transmission chain rolling on it can be coated with a relatively soft material, or vice versa. This has the result that the abrasion behavior, on the one hand, and therefore wear of the chain is reduced, but at the same time noise development during rolling of the chain can be substantially reduced.

According to still another advantageous variant of the chain link, at least one part of the chain link is made from a material differing from the composition of a recyclable raw material, a material that binds this recyclable raw material, and optionally auxiliaries and additives. Formation of at least part of the chain link from metal is particularly advantageous here. This permits the use of reinforcement structures made of metal that positively influence the stability and lifetime of the chain link, or also formation of particularly stressed parts of the chain link from metal or a harder plastic.

According to another inventive idea, a method for production of at least a part of a chain link of a power transmission chain is proposed in which the at least one part made from a material containing a recyclable raw material and a material that binds it and optionally auxiliaries or additives is injection molded or extruded.

This type of method offers the advantage that a chain link produced by this method exhibits improved ecological balance in comparison with ordinary chain links. In addition, this method is advantageous from the standpoint of sustainable management, in which the ultimate resources of non-recyclable raw materials, for example, petroleum, are spared. The use of additives or auxiliaries is also advantageously possible. Significant properties of parts of a chain link can be altered with them.

Standard dies can be used for injection molding or extrusion, but it is also possible to use special dies, as proposed, for example, in DE 199 34 871 A1.

The recyclable raw material, for example, is a polysaccharide, preferably cellulose. Such cellulose is obtained, for example, from wood, flax, hemp, straw, wool, sisal, cotton, linen, hay, rice husks, bamboo, papyrus, reed, cork, or similar materials, as well as from mixtures of at least two of these materials. All these materials are frequently present as waste products from production processes for other products. For example, wood wastes occur in the furniture industry, and linen, wool or cotton wastes in the clothing industry. It is therefore advantageously possible to employ these wastes in an environmentally safe and acceptable fashion.

Ecologically acceptable use of products whose lifetime has elapsed can also be accomplished, using products from such compositions. For example, the raw materials present in furniture items can be acceptably used in this way. Use of old clothing, carpets, etc., for production of parts of chain links of power transmission chains is also possible. The fibers so recovered are processed with a material that binds the recyclable material. Polymers, preferably elastomers can be used here. The use of a polyhydrocarbon, preferably a polyolefin, preferably polyethylene or polypropylene, especially polypropylene, is also possible. Polypropylene offers the advantage that it is easy to process and is degradable.

In addition, to produce chain links from a composition consisting of a recyclable raw material and a material that binds it, as well as optionally auxiliaries and additives, the same dies, for example for injection molding or extrusion, can be used that are also used for normal plastics. Consequently, it is not necessary to incur costs for creation of new dies or refitting of existing dies.

It is also advantageous that not only chain links can be produced from at least one recyclable raw material and a material that binds it in the same machine, but, as required, chain links can also be produced from normal plastics, for example, polyamide.

During admixing of at least one corresponding additive or auxiliary, it is possible to produce chain links or parts of chain links whose flash point lies about 150° C., preferably above 200° C. and especially above 250° C. This permits the use of such chain links even under special circumstances, for example, in spaces with explosion hazard.

By supplying at least one auxiliary or additive, it is also possible to alter the composition so that the ignition point of the chain link or part of a chain link lies above 250° C., preferably above 350° C., especially above 400° C. This is a requirement for use of such chain links, for example, in spaces with explosion hazard.

Individual or several properties of the chain link being produced can also be altered by producing the chain links with the use of auxiliaries or additives. For example, the abrasion behavior can be improved, for example, by adding carbon black. The color, density and sliding properties of the chain link can likewise be improved by adding dyes, fillers and lubricants. In addition, the lifetime of the chain link can be positively influenced by adding antioxidants or stabilizers.

It is also possible to coat the chain link with at least one material during the process for production of a chain link or part of a chain link. By coating, the chain links can also be used under circumstances in which they are exposed to aggressive media. Such coating is also sometimes possible so that particularly loaded region of the chain link are coated, or the entire chain link can be coated. Improvements in wear are advantageously produced in the chain link on this account, or a reduction of noise development during rolling of the chain. It is also possible for cost reasons to coat only the parts of the chain link that are affected by wear.

According to an advantageous embodiment of the method, a processing temperature lies in the range of 130 to 250° C., especially in the range from 160 to 195° C. According to still another advantageous embodiment of the method, a final pressure of at least 200 bar for at least 1 sec, preferably at least 300 bar for at least 1 sec, especially at least 350 bar for at least 1.5 sec can optionally be used.

According to still another advantageous embodiment of the method, at least one part of the chain link is formed from a material different from the composition of a recyclable raw material, a material that binds this recyclable raw material and optionally auxiliaries and additives. This advantageously permits the design of connectors or separation elements from other materials, for example, metals or ordinary plastics, depending on the area of use of the guide chain. The properties of the chain link being produced can therefore be adapted individually to the use circumstances and the demands on the chain link resulting from them.

According to still another advantageous embodiment of the method, at least one part of the chain link is formed from metal. This advantageously permits injection molding of reinforcement units, like metal grates with the composition according to the invention from a recyclable raw material, a material that binds it and optionally auxiliaries and additives that serve to reinforce the chain link and serve for long lifetime. It is also possible to form the parts of a chain link particularly affected by wear from metal, or also the regions on which particularly large forces act during operation of a power transmission change assembled from chain links.

A multi-component injection molding method is used for another advantageous embodiment of the method. This permits different parts of a chain link to be injection molded uniformly or in succession from different materials in an injection molding process. For example, it is possible to mold the plates of a chain link from a composition of recyclable raw material, binding material and optionally auxiliaries and additives, and to form at least one crosspiece from the usual plastics, for example, polyamide. It is also possible with a multi-component injection molding method to carry out coating of at least parts of the chain link in one working step.

Additional details and advantages of a chain link and method for production of a chain link according to the invention are explained by means of preferred practical examples depicted in the drawings, but the invention is not restricted to these.

DETAILED DESCRIPTION OF THE PREFERRED EMBODIMENTS

Figure 1:
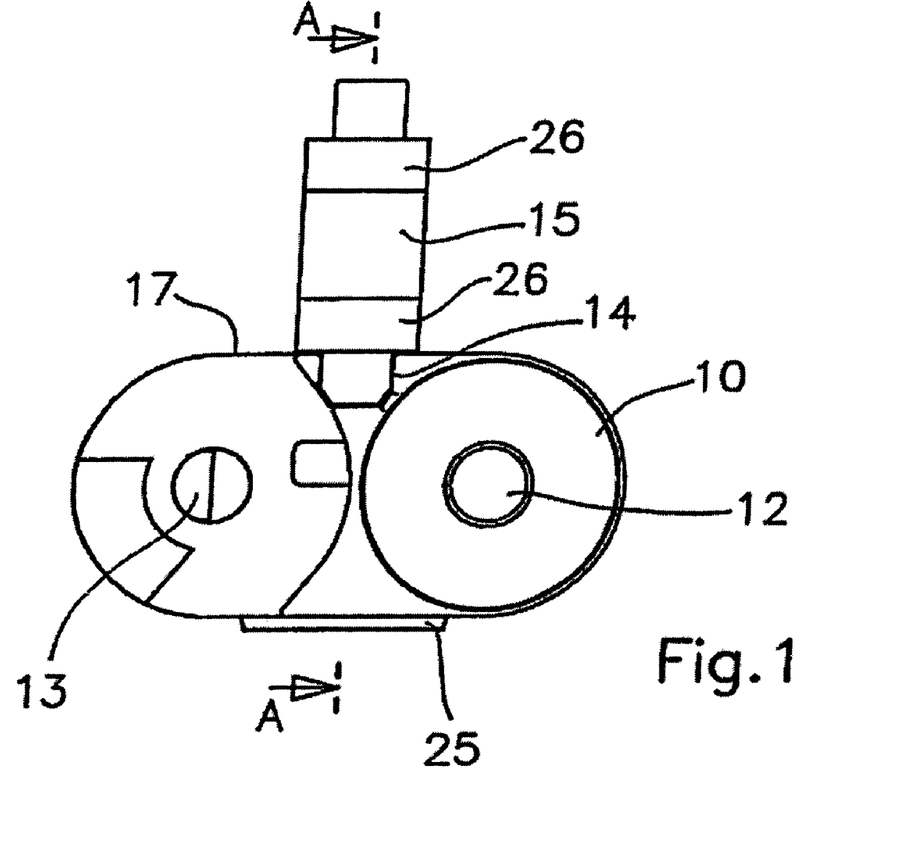
FIG. 1 schematically depicts in a front view a first practical example of a chain link.
Figure 2:
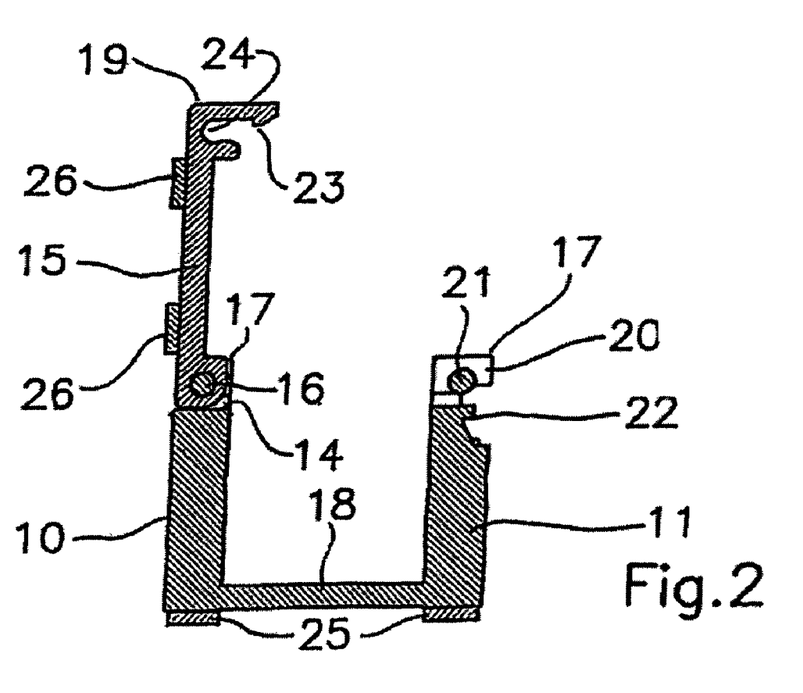
FIG. 2 depicts a section along line A-A of FIG. 1.
Figure 3:
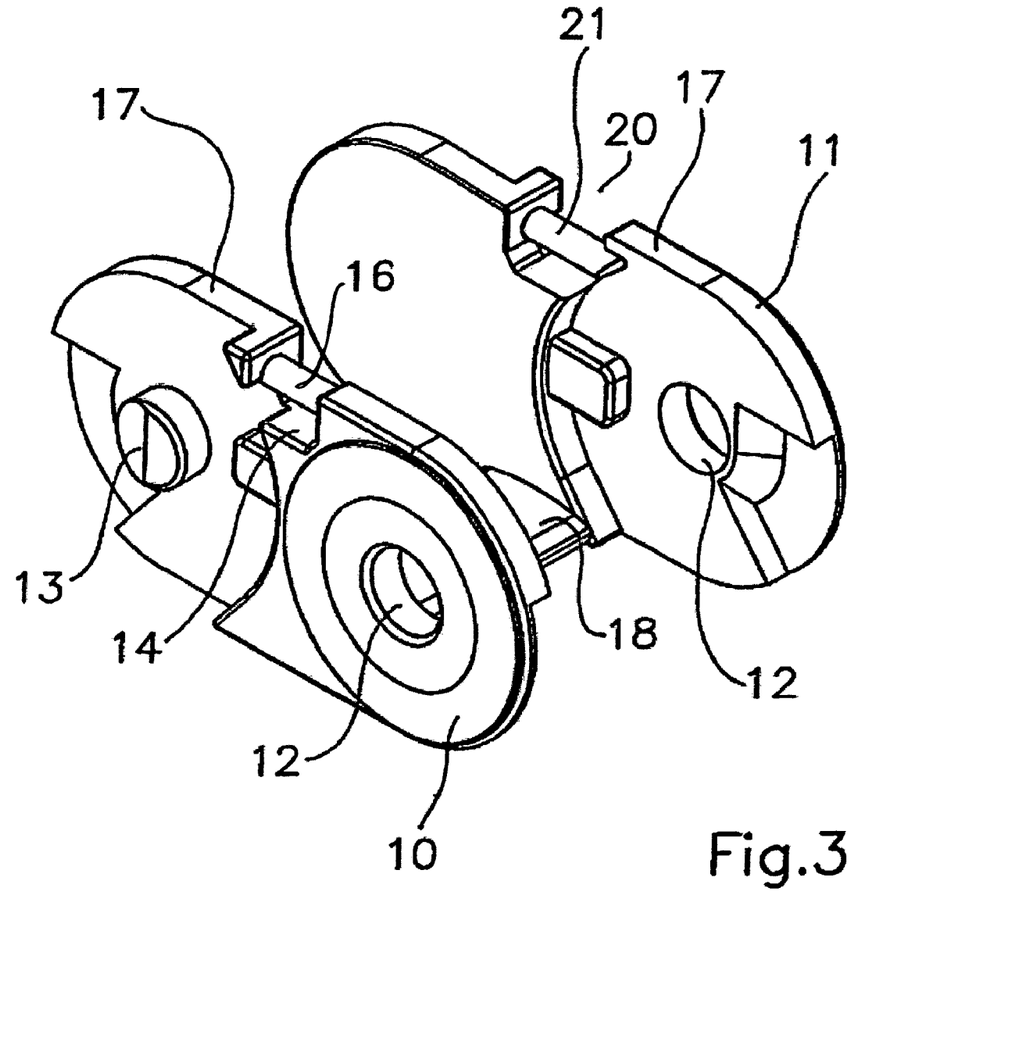
FIG. 3 depicts a U-shaped chain link part.

FIGS. 1 to 3 show a first practical example of a chain link according to the invention. FIG. 3 schematically depicts a U-shaped chain link part in a perspective view.

The chain link is at least partially made from a composition that contains a recyclable raw material and a material that binds it. Auxiliaries and additives can optionally be added that improve certain properties of the chain link. For example, auxiliaries or additives that increase the flash point and/or ignition point of the chain link elements, or improve the wear behavior and reduce noise development during operation of a power transmission chain produced from these chain links can be added.

Wood is used in this practical example as recyclable raw material, but the use of flax, hemp, straw, wool, sisal, cotton, linen, hay, rice husks, bamboo, papyrus, reed, cork or similar materials or mixtures of at least two of them is also possible. The wood can be furnished in the form of sawdust, as small pellets or the like during production of the composition. Polypropylene is used in this practical example as the material that binds the wood fibers, but all thermoplastic elastomers can be used, for example, amide, ester, olefin, styrene or urethane polymers. The weight ratio of wood to polypropylene is 17/3 in the present example.

The chain link is proposed for a power transmission chain that can consist of a number of such chain links. Power transmission chains are used to guide lines or tubes, for example, for electricity, water, steam, etc.

The chain link has two plates 10, 11 spaced from each other. The plates 10, 11 are joined in the depicted practical example by means of a lower rigid crosspiece 18. Each plate 10, 11 has a hole 12 on an end region. A pin 13 is provided in the opposite end region of the plate. The holes 12 and pins 13 of the chain plates 10, 11 are designed so that a pin 13 can be introduced to the hole 12 of a chain plate of an adjacent chain link so that several chain plates can be joined, forming a strand.

Starting from edge 17 of plate 10 and across the longitudinal extent of plate 10 a recess 14 is provided. A three-dimensionally designed articulation axis 16 is present with in recess 14, forming a component of plate 10. The articulation axis 16 has a circular cross-section, as is apparent from FIG. 2.

To improve the wear resistance or reduce noise development during operation of a chain formed from chain links, it is also possible according to the invention to coat the edge 17 of plate 10 and the corresponding edge of plate 11. To achieve this, a lower support surface 25 and an upper support surface 26 can be molded onto the chain link. The upper support surface 26 is molded to a crosspiece 15, while the lower support surface 25 is molded to the plates 10, 11. It is possible according to the invention to form the support surfaces 25, 26 from materials other than the composition of a recyclable raw material, a binding material and optionally auxiliaries and additives. It is also possible according to the invention to coat the entire chain link in order to improve properties like lifetime and resistance to decay.

A crosspiece 15 is articulated with plate 10. For example, this crosspiece 15 can also be formed from a material that does not correspond to the composition of a recyclable raw material and a material that binds it. For example, it is possible to make crosspiece 15 from plastic or also metal. By appropriate choice of materials, the chain link can be adapted to practically any conceivable requirement with reference to lifetime, price, etc. FIG. 2 shows that a section of crosspiece 15 seamlessly surrounds the articulation axis 16.

The crosspiece 15 has a hook 19 on its free end. Hook 19 has a hook tab 23 and a bolt mount 24.

Starting from the longitudinal edge 17 of plate 11 and across the longitudinal extent of plate 11, a hook mount 20 is provided. The hook mount 20, as is particularly apparent from FIG. 3, has a bolt 21 running in the longitudinal direction of plate 11. A protrusion 22 is provided in the outer wall of plate 11.

The crosspiece 15 is pivotable around articulation axis 16. In the closed state of the chain link, bolt 21 engages in bolt mount 24 of hook 19. The protrusion 22, which cooperates with hook tab 23, is formed beneath bolt 21 so that the crosspiece 15 can be releasably joined to plate 11. Bolt 21, which engages in the bolt mount 24 in the closed state, prevents inadvertent opening of the crosspiece 15 when the plates 10, 11 are moved relative to each other.

The chain link depicted in FIGS. 1 and 2 can be produced as follows: the plates 10, 11 of the chain link are first formed. They can be formed from the aforementioned composition, for example, injection molded. It is also possible to produce only one of the plates 10, 111 from the aforementioned composition and to form the other plate, for example, from plastic or at least partly from metal.

By using a multi-component injection molding method, it is possible to first mold the lower support surface 25, optionally also from a different material, that advantageously improves the wear behavior and reduces noise development during operation of a power transmission chain made from such chain links.

At least plate 10 has an articulation axis 16. Then crosspiece 15 is formed during simultaneous formation of an articulated connection between plate 10 and crosspiece 15. In the material choice from crosspiece 15 it is also possible to use a different material than that for plates 10, 11 or also the same material.

For example, it is also conceivable to form crosspiece 15 from metal and the plates 10, 11 from the aforementioned composition.

The lower support surface 25 and the upper support surface 26 in the multi-injection molding process are molded directly from a different material, for example from a plastic like polyamide. It is possible that the lower support surface 25 and the upper support surface 26 are molded from different materials. The wear behavior is improved. When chain links are combined into a power transmission chain, it is possible, during use of chain links with lower support surfaces from corresponding different materials for the upper and lower strand to reduce noise development during running of the power transmission chain. This is advantageously possible if chain links with a comparatively hard upper support surface 26 are used for the lower strand and chain links with a comparatively soft upper support surface 26 are used for the upper strand or vice versa. It is not only possible according to the invention to form the lower support surface 25 and the upper support surface 26 from plastic, but as an alternative and/or in addition, to also form them from metal.

The chain link depicted in FIGS. 1 to 3 has a U-shaped chain link part formed by the plates 10, 11 and the crosspiece 18. This is not absolutely necessary. The crosspiece 18 can also be releasably joined to plates 10, 11. For the material choice in production of crosspiece 18 what was said concerning the material choice of crosspiece 15 applies.

There is also the possibility of providing two crosspieces articulated to the plate on one of the two plates. These crosspieces are then connectable to the opposite plate. There is also the possibility of forming plate 10 with a crosspiece 15 that is articulated with plate 11.

In production of the individual parts of the chain link it is possible according to the invention to include additives in the composition that increase the flash point and ignition point or alter the color of the chain link. In addition, other additives or auxiliaries can be used for improved lifetime, for example, stabilizers or antioxidants.

Figure 4:
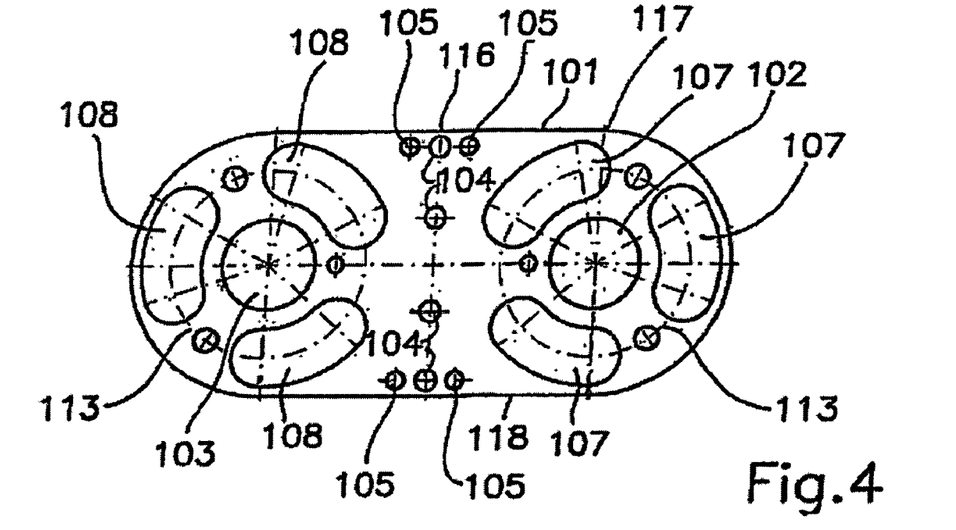
FIG. 4 depicts a core of an additional practical example of a chain link part.

FIG. 4 shows a core 101 for another practical example of a chain link. The core 101 consists of a composition of a recyclable raw material and a material binding this, but it can also be formed from metal. The core 101 is essentially plate-like. Core 101 has two articulation holes 102, 103 spaced from each other. The articulation hole 102 is enclosed by three arc-like recesses 107, formed symmetrically to an imaginary circumference 113. The imaginary circumference 113 is coaxial to articulation hole 102. The articulation hole 103 is enclosed by three recesses 108 that are designed arc-like. The recesses 108 are symmetric to an imaginary circumference 113 that is coaxial to the articulation hole 103. Core 101 is formed with mirror symmetry relative to the short center axis 116. The longitudinal edges 117, 118 of core 101 trend essentially perpendicularly to the short center axis 116. Holes 104 are formed at a spacing from each other on center axis 116. In the region of longitudinal edges 117, 118, additional holes 105 lying essentially on a line parallel to longitudinal edge 117 or 118 are formed. A hole 104 lies between two holes 105.

Figure 5:
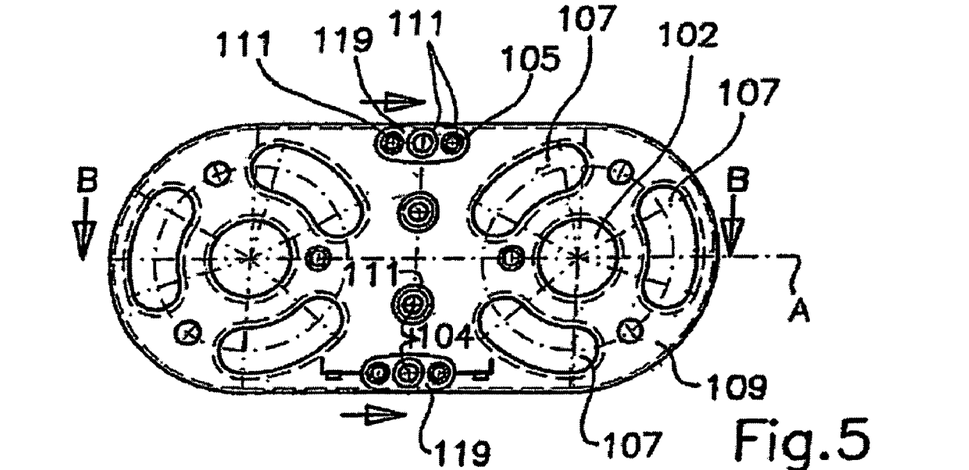
FIG. 5 depicts a chain link part according to the invention with a core according to FIG. 4.
Figures 6, 7:
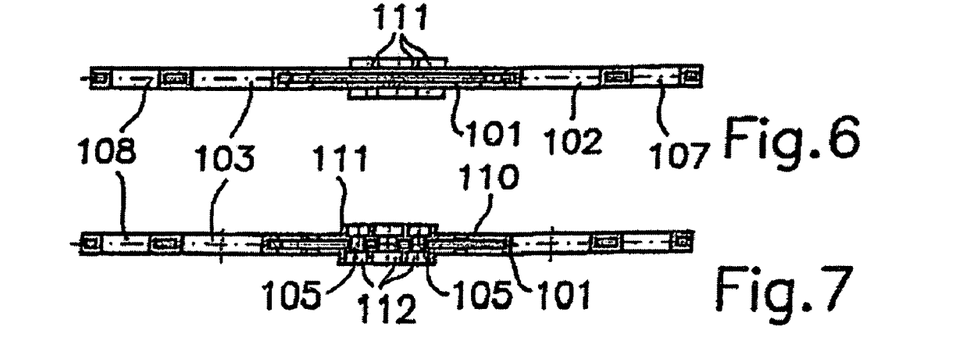
FIG. 6 depicts the chain link part according to the invention in a top view and in a section along center line A in FIG. 5.
FIG. 7 depicts the chain link part according to FIG. 1 in a top view and in a section along line B-B in FIG. 5.
Figure 8:
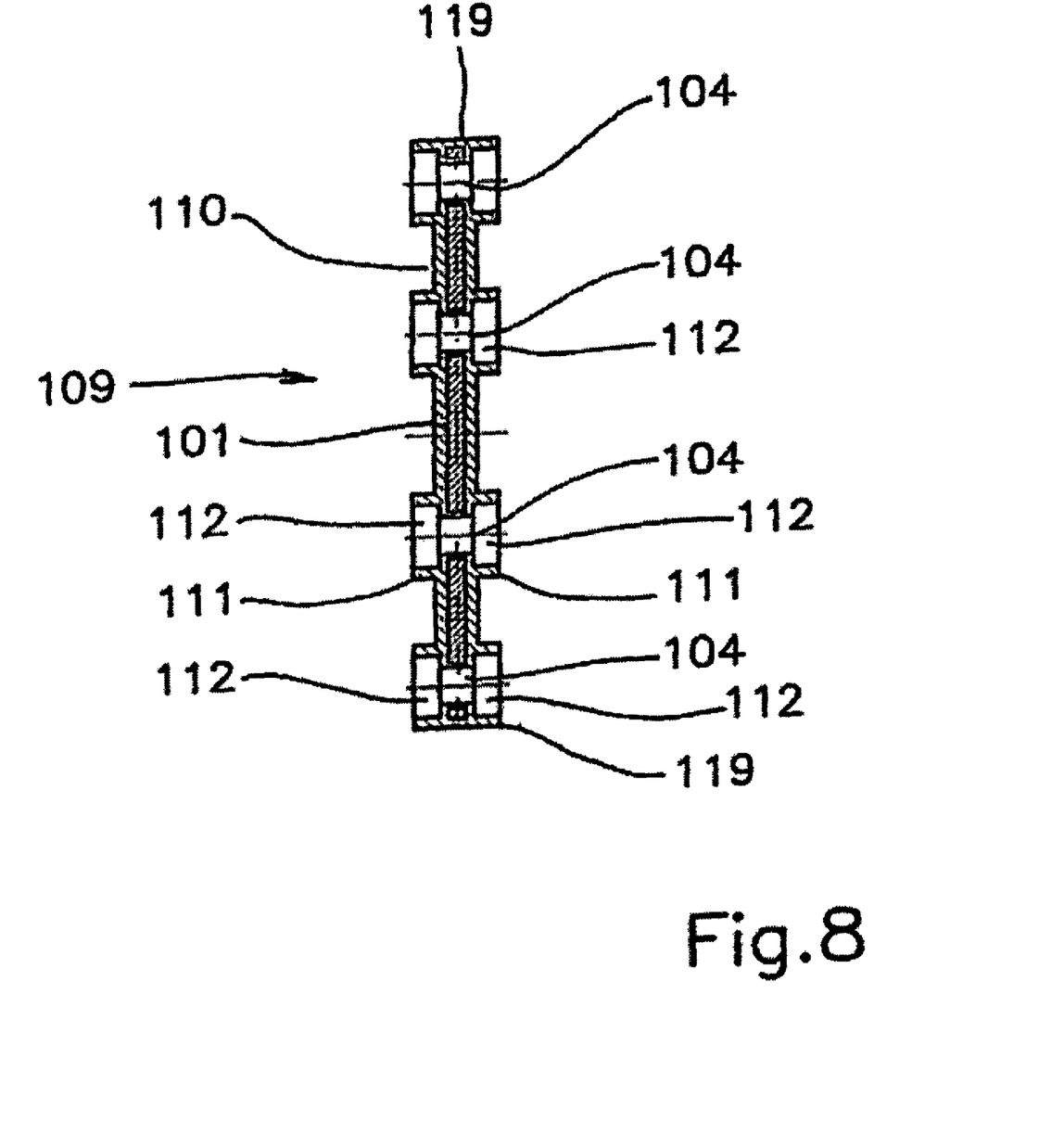
FIG. 8 depicts the chain link part according to FIG. 4 in a side view from the left and in full section.

A chain link part 109 with a core 101 is depicted in FIG. 5. FIGS. 6, 7 and 8 show sectional views of the chain link part 109. As is particularly apparent from FIGS. 6, 7 and 8, the core 101 of the chain link part 109 is fully enclosed by a core shell 110. The core shell 110 consists of a plastic, but can also consist of a recyclable raw material, a material binding it and optionally auxiliaries and additives with a different composition in comparison with the composition of core 101. It is also possible to form the core 101 from metal and the core shell from a recyclable raw material, a material binding it and optionally auxiliaries and additives in order to increase the strength of the chain link, for example. A corresponding design of the core shell 110 has the advantage that the chain links can be adapted to the corresponding use situation. If the core shell 110 is made of plastic, a chain link is obtained having the essential properties of an ordinary chain link, like abrasion and running noise, which, however, is much more environmentally friendly and can be produced much more cost-effectively in comparison to a pure plastic chain.

Core 101 can preferably be a structure, preferably a grid-like structure. There is also the possibility of forming the bolt and/or the bolt mounting element from a wear-resistant material, especially metal. The bolt and/or bolt mounting element is then enclosed by the recyclable raw material, the material binding it and optionally auxiliaries and additives. It is possible according to the invention to form any parts of the chain link from wear-resistant materials, especially metal, in which these parts can be molded on or subsequently applied.

The articulation holes 102, 103, as well as the recesses 107, 108 of the chain link part 109 are free. Each hole 104, 105 is enclosed by a peripheral collar 111. Each collar 111 limits a headspace 112 in which a screw head can be introduced. Collar 11 of the adjacent holes 105, 104, 105 is formed by a common extension 119.

The invention claimed is:

1. A chain link of a power transmission chain formed of a composition comprising:
    a. a recyclable raw material;
    b. a binding material binding the recyclable raw material; and the composition has the following properties:
    c. an elongation at tear according to DIN 53455 of at least 0.5%;
    d. a tensile modulus of elasticity according to DIN 53455 of at least 4000 N/mm2;
    e. a bending strength according to DIN 53432 of at least 40 N/mm2;
    f. an edge fiber elongation according to DIN 53452 of about 2%;
    g. a bending modulus of elasticity according to DIN 53452 of at least 3000 N/mm2;
    h. an impact strength according to DIN 53453 of at least 4 kJ/m2;
    i. a notched impact strength according to DIN 53453 of at least 2.5 kJ/m2;
    j. a ball indentation hardness according to DIN 53456 of at least 50 N/mm2;
    k. a density according to DIN 53479 of at least 1.2 g/cm3; and
    l. an impact tensile strength according to DIN 53448 of about 15 kJ/m2.

2. The chain link of claim 1 wherein the composition further has the property of:
    a tensile strength according to DIN 53455 of at least 20 N/mm2.

* * * * *